(No Model.)
E. K. RODEN.
INSERTIBLE CHAIN LINK.
No. 567,511. Patented Sept. 8, 1896.
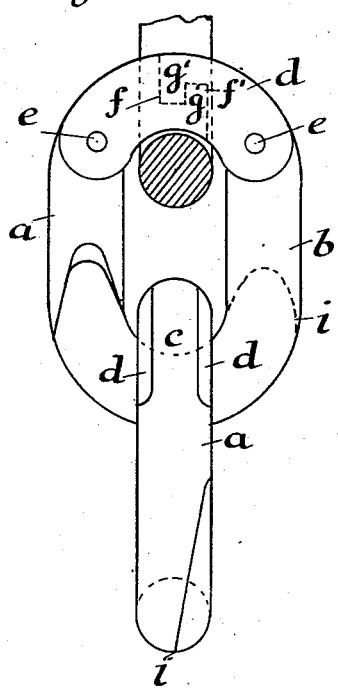
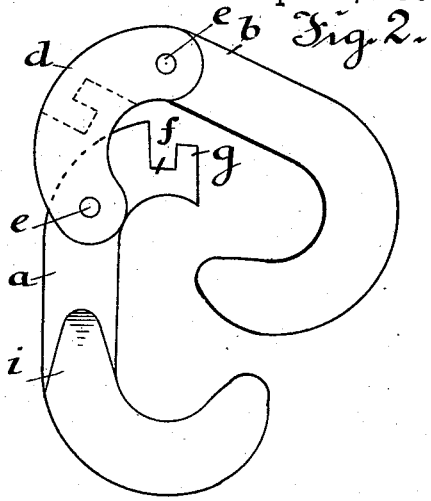
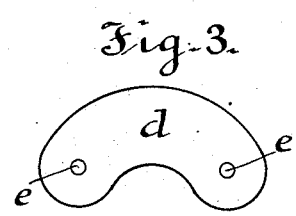
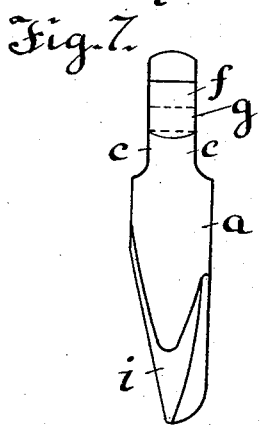
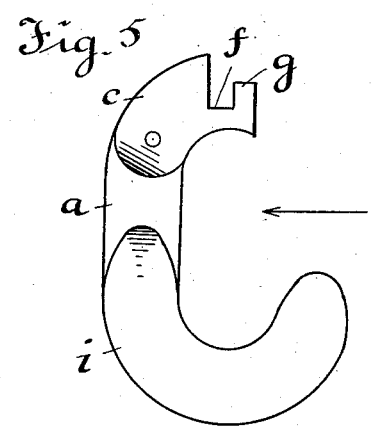
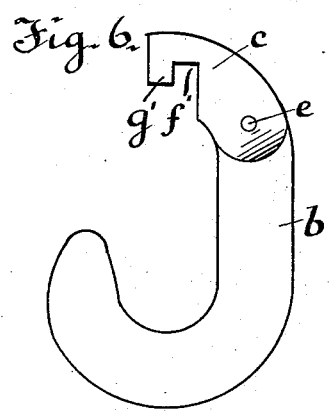
WITNESSES:
Ernst Lundgren
W. J. Morgan
INVENTOR
Ernest R. Roden
BY A. P. Thayer
ATTORNEY

UNITED STATES PATENT OFFICE.

ERNEST K. RODEN, OF NEW YORK, N. Y., ASSIGNOR TO WILLIAM AUGUST NILSON, OF BROOKLYN, NEW YORK.

INSERTIBLE CHAIN-LINK.

SPECIFICATION forming part of Letters Patent No. 567,511, dated September 8, 1896.

Application filed January 16, 1896. Serial No. 575,682. (No model.)

*To all whom it may concern:*

Be it known that I, ERNEST K. RODEN, a subject of the King of Sweden and Norway, and a resident of New York city, in the county and State of New York, have invented certain new and useful Improvements in Insertible Chain-Links, of which the following is a specification.

My invention consists of an improved construction of insertible links for mending broken chains, as hereinafter described, reference being made to the accompanying drawings, in which—

Figure 1 is a plan view of my insertible link coupled with other links as in use, one of the other links being also shown as my insertible link in edge view and the other being a common link and shown in section. Fig. 2 is a plan view of my improved insertible link as when opened preparatory to coupling with other links. Fig. 3 is a plan view of one of a pair of coupling-pieces used for connecting the two essential parts of the link together. Fig. 4 is an edge view of the coupling-piece represented in Fig. 3. Fig. 5 is a side view of one of the principal parts of my improved insertible links. Fig. 6 is a side view of the other of the said insertible parts, and Fig. 7 is an edge view of the part represented in Fig. 5 as seen in the direction indicated by the arrow.

I provide two principal hook-shaped parts, as $a$ and $b$, each comprising about a half part of the link and made of round or approximately round metal suitable for chain-links, said parts being flattened or reduced in thickness on both sides of one end portion, as represented at $c$, suitably to be coupled by a pair of curved plates $d$ and pivots $e$, forming two joints which allow movements of the parts $a\,b$ along each other to a limited extent in parallel lines, or practically so, besides the turning movements on the pivots, and the flattened parts $c$ have the relatively reverse interlocking notches $f\,f'$ and spurs $g\,g'$, which, being connected by the proper lengthwise movements of the parts $a\,b$ thus permitted, mainly hold this end of the link together when exposed to strains, the plates $d$ being mainly to couple said parts for opening and closing at the other end of the link to engage the links to be coupled by the insertible link, but they are, however, to some extent serviceable as an element of strength in the chain, besides restoring to the flattened parts $c$ the full measure of size and form corresponding with the rest of the link. The other end portions of the parts $a\,b$ are scarfed or tapered on opposite sides, respectively, as shown at $i$, to lap each other when closed after being inserted in the links to be coupled and form a continuous portion of the link of like size and form as the rest.

It will be seen that the several parts of the link can be produced by casting or drop-forging and can be riveted very cheaply, and that they provide a substantial and efficient mending-link to be kept on hand, on shipboard, and elsewhere, always ready for mending broken chains, so that work may not be interrupted and delayed, as when such links or ordinary means of mending are not at hand.

I claim—

The improved insertible link composed of two hook-shaped essential parts $a\,b$, having the flattened and reversely notched and spurred parts $c$, and the reversely scarfed or tapered portions $i$, said parts $a\,b$, being coupled by plates $d$, pivoted to them respectively substantially as described.

Signed at New York city, in the county and State of New York, this 26th day of December, A. D. 1895.

ERNEST K. RODEN.

Witnesses:
W. J. MORGAN,
C. SEDGWICK.